United States Patent
Jacquet

(10) Patent No.: US 10,365,170 B2
(45) Date of Patent: Jul. 30, 2019

(54) METHOD AND DEVICE FOR INDICATING THE FUEL CONSUMPTION AND/OR EFFICIENCY OF A HEATING UNIT

(71) Applicant: BOOSTHEAT, Nîmes (FR)

(72) Inventor: Luc Jacquet, Nîmes (FR)

(73) Assignee: BOOSTHEAT, Nimes (FR)

( * ) Notice: Subject to any disclaimer, the term of this patent is extended or adjusted under 35 U.S.C. 154(b) by 428 days.

(21) Appl. No.: 14/786,713

(22) PCT Filed: Apr. 22, 2014

(86) PCT No.: PCT/FR2014/050967
§ 371 (c)(1),
(2) Date: Oct. 23, 2015

(87) PCT Pub. No.: WO2014/174199
PCT Pub. Date: Oct. 30, 2014

(65) Prior Publication Data
US 2016/0076950 A1    Mar. 17, 2016

(30) Foreign Application Priority Data

Apr. 24, 2013    (FR) ...................................... 13 53735

(51) Int. Cl.
| | |
|---|---|
| G01K 17/06 | (2006.01) |
| F24D 19/10 | (2006.01) |
| G01K 17/10 | (2006.01) |
| G06Q 50/06 | (2012.01) |
| G06Q 30/04 | (2012.01) |

(52) U.S. Cl.
CPC ......... *G01K 17/06* (2013.01); *F24D 19/1048* (2013.01); *G01K 17/10* (2013.01); *G06Q 50/06* (2013.01); *G06Q 30/04* (2013.01)

(58) Field of Classification Search
CPC .... G06Q 50/06; F24D 19/1048; G06K 17/10; G06K 17/06
See application file for complete search history.

(56) References Cited

U.S. PATENT DOCUMENTS

| | | | |
|---|---|---|---|
| 6,701,721 | B1 | 3/2004 | Berchowitz |
| 2010/0174643 | A1 | 7/2010 | Schaefer et al. |
| 2011/0004350 | A1 | 1/2011 | Cheifetz et al. |
| 2013/0323102 | A1 | 12/2013 | Joffroy |

FOREIGN PATENT DOCUMENTS

| | | |
|---|---|---|
| DE | 102008003866 A1 | 2/2004 |
| FR | 2457444 A1 | 12/1980 |
| GB | 2106992 A | 4/1983 |
| JP | S58133762 U1 | 9/1983 |
| JP | 2007249290 A | 9/2007 |

*Primary Examiner* — Sujoy K Kundu
*Assistant Examiner* — L. Anderson
(74) *Attorney, Agent, or Firm* — Seed IP Law Group LLP

(57) ABSTRACT

A method indicates to a user the fuel consumption and/or efficiency of a heating installation having a heat pump with a thermal compressor, a heating fluid distribution circuit and radiators receiving a first quantity of energy Q1. The method includes the steps: A—of determining, over a predetermined time period a second quantity of energy Q2, corresponding to the supply of heat energy used to drive the compressor, B—of determining, over the same predetermined time period, a third quantity of energy Q3 corresponding to free energy taken from the external environment, C—of displaying the quantities Q2 and Q3, in relation to the predetermined time period, on a display screen and/or in a document for invoicing the customer.

10 Claims, 2 Drawing Sheets

METHOD AND DEVICE FOR INDICATING THE FUEL CONSUMPTION AND/OR EFFICIENCY OF A HEATING UNIT

BACKGROUND

Technical Field

The present invention relates to heating units and to methods and devices for indicating the consumption and/or efficiency of said heating units.

More specifically it concerns a heating unit comprising at least one heat pump, a circuit for heating fluid distribution and a plurality of convectors or radiators.

DESCRIPTION OF THE RELATED ART

From the prior art it is known to determine a performance factor (or efficiency factor) for the heat pump in question, in particular the devices using an electric compressor. However, the efficiency factor of such a unit depends on climatic conditions, in particular the outside temperature of the environment in which the calories are gathered. In practice, it is common to add a backup heating device to take over for the heat pump in order to get through cold critical periods.

But in the known art, the user of such a heating unit has few means for comparing the actual performance compared to the stated performance and for verifying that the expected savings from the heat pump system are materialized as actual savings. In particular, the user (the payer) cannot deduce from their electricity bill the savings that they got from the heat pump and has no information on the ecological footprint of their unit.

BRIEF SUMMARY

It thus appears attractive to improve the information made available to the paying user concerning the heating unit, the energy performance thereof and the economic and ecological relevance thereof.

According to the present invention, a method for indicating the consumption and/or efficiency of a heating unit to the user is proposed, where said heating unit includes at least one heat pump with a thermal compressor driven by means of a thermal energy feed, a heating fluid distribution circuit and a plurality of convectors or radiators receiving a first energy quantity Q1, where the method comprises at least:

determining, over a preset time period, a second energy quantity Q2, corresponding to said thermal energy feed and comprising a billed energy Q2F corresponding to a billable quantity of fuel consumed by the heat pump, determining, over the same preset time period, a third energy quantity Q3 corresponding to a free energy gathered in the outside environment, either (B1-) directly by means of temperature and flow-rate sensors relative to an outside unit of the heat pump, or (B2-) indirectly by measuring, over the same preset time period, the first energy quantity Q1 supplied to the distribution circuit and deducing Q3 from it by using Q3=Q1-Q2, displaying at least the quantities Q2F and Q3, corresponding to the preset time period, on the display screen and/or a document intended for billing the client.

Because of these arrangements, the various energy quantities put to use for the heating unit can be measured and this information can be made available to the user, in particular to the user in charge of paying the energy bill for the billed fuel. The user can thus get useful information on the economic and ecological performance of their heating unit. The determination of this information can be relative to a cumulative metering (meaning integration) over one or more preset periods.

Additionally note that the thermal compressor mainly uses the heating fluid distribution circuit as the cold source; thereby all the calories which are made available for operating the thermal compressor can be delivered in the heating fluid distribution circuit; since no calories are dissipated (and therefore lost) in any auxiliary cooling circuit.

In various embodiments of the method according to the invention, one and/or another of the following arrangements could furthermore be used:

According to an aspect, the thermal energy feed is mainly provided by means of a combustible burner; by this means the electric grid is not called on to provide the calories moving the compressor;

According to another aspect, the combustible is gas and the billed consumption is measured by means of a gas meter; thereby this means a very common combustible is used and the consumption of this combustible can be easily known;

According to another aspect, the combustible is domestic fuel oil and the billed consumption is measured by means of a fuel oil meter; thereby this means this very common combustible is used and the consumption of this combustible can be easily known;

According to another aspect, the combustible is wood pellets and the billed consumption is measured by means of a meter, for example by weighing; thereby this means a renewable combustible is used and the consumption of this combustible can be easily known.

According to another aspect, the first energy quantity Q1 supplied to the distribution circuit is measured by means of first and second temperature sensors respectively arranged on the outbound and on the return of the distribution circuit and by means of a heating fluid flow-rate sensor; by this means reliable information is obtained about the first energy quantity Q1;

According to another aspect, a financial equivalent for the nonbillable energy quantities is additionally displayed, specifically for the energy quantity Q3, and if relevant/appropriate for the energy quantity Q2NF, knowing that Q3+Q2NF is equal to Q1-Q2F; by this means the user can directly know the savings achieved through the performance of their heating unit;

According to another aspect, the heat pump does not have an electric pump and the electric consumption of the heating unit is far below Q1, for example less than 10% of Q1nom, where Q1nom corresponds to the nominal power of the heating unit; such that the heating unit places very little demand for electric energy.

The invention additionally targets a device for indicating the consumption and/or efficiency of a heating unit, said heating unit including at least one heat pump having a thermal compressor moved by means of a thermal energy feed, a heating fluid distribution circuit and a plurality of convectors or radiators, where the device comprises:

means for determining a first energy quantity Q1 provided to the convectors or radiators, or means for determining the energy quantity Q3 corresponding to free energy collected in the outside environment;

means for determining the quantity of energy corresponding to a billed consumption (Q2, Q2F) of combustible consumed by the heat pump, an electronic unit to which the means for determining the energy quantities Q3, Q2 are connected, characterized in that this electronic unit is adapted for calculating energy quantities (Q2, Q3) over a preset time period, and/or for displaying this information on a display screen, and/or for preparing printing of a document intended for billing the client.

In various embodiments of the device according to the invention, one and/or another of the following arrangements could furthermore be used:

According to an aspect, the thermal energy feed is mainly done by means of a combustible burner, where the combustible is preferably gas, domestic fuel oil or wood pellets, where the billed consumption Q2F is measured by means of the gas, fuel oil or other meter; by means of which a very common combustible is used and reliable information about the billable energy quantity Q2F is obtained;

According to another aspect, the device can furthermore include temperature and flow-rate sensors for a unit outside the heat pump in order to measure the energy quantity Q3 corresponding to a free energy gathered in the outside environment; such that the measurement of the third energy quantity Q3 can be obtained directly and reliably;

According to another aspect, the device can furthermore comprise temperature and flow-rate sensors relative to the heating distribution circuit in order to measure the energy quantity Q1 provided to the heating distribution circuit; such that the measurement of the first energy quantity Q1 can be obtained directly and reliably;

According to another aspect, the heat pump does not have an electric pump and the electric consumption of the heating unit is far below Q1, for example less than 10% of Q1nom, where Q1nom corresponds to the nominal power of the heating unit; such that the heating unit has very little demand for electric energy.

BRIEF DESCRIPTION OF THE SEVERAL VIEWS OF THE DRAWINGS

Other aspects, goals and advantages of the invention will appear upon reading the following description of two embodiments thereof given as nonlimiting examples with the help of the attached drawings in which.

In the various figures, the same references designate identical or similar items.

DETAILED DESCRIPTION

Figure 1:
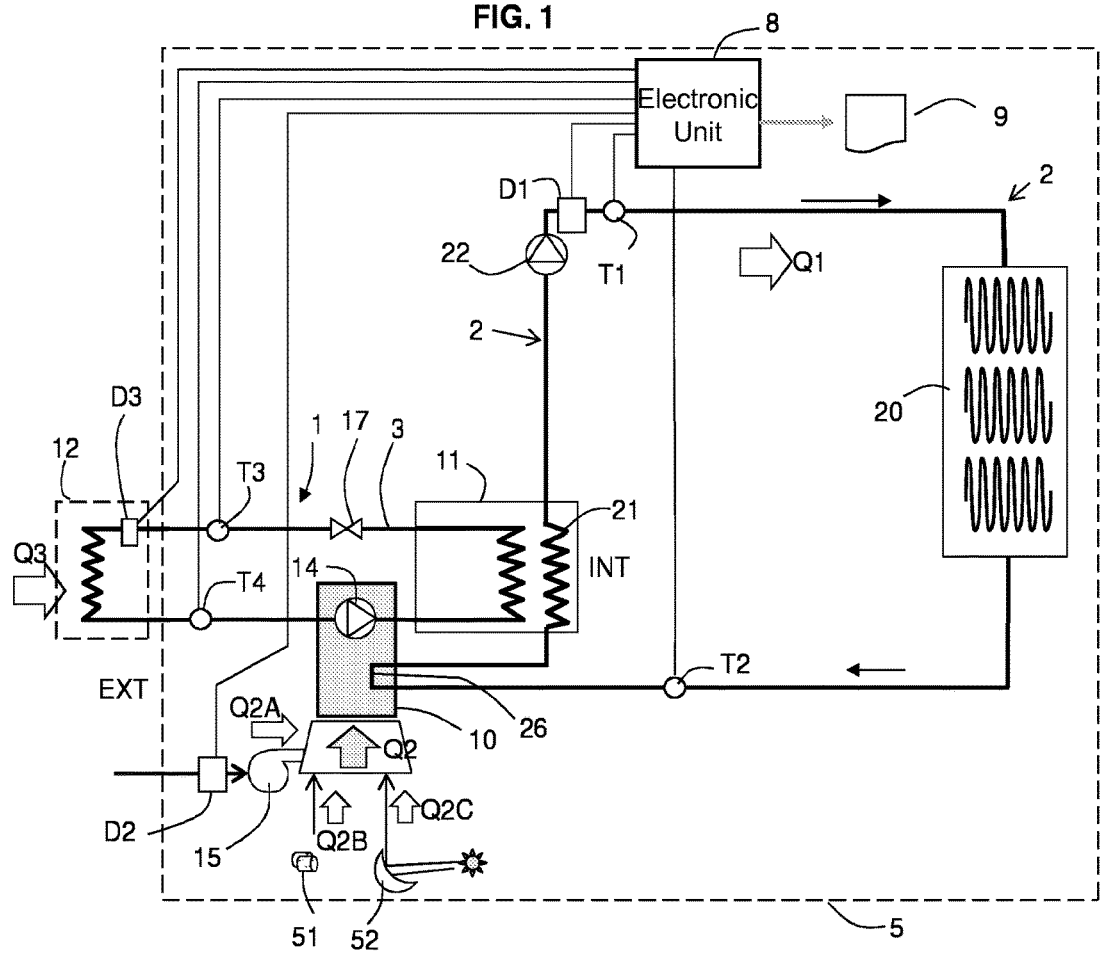
FIG. 1 shows a schematic drawing of a heating unit according to an embodiment of the invention.

FIG. 1 schematically shows a heating unit including a heating fluid distribution circuit 2, where the fluid delivers calories to a plurality of receivers-exchangers, of convective or radiative type 20 as known in the state-of-the-art.

In the shown example, the fluid can be water or an aqueous solution, but the use of air or another fluid for the distribution circuit is not excluded. The receivers-exchangers can take the form of a radiant floor, conventional wall heating radiators or any other type of exchangers serving to deliver calories to the inside of a building 5. The building in question can be an individual house, a shared use building, an industrial building or any other type of room requiring a heating unit. The distribution circuit can also serve several buildings or several rooms. The distribution circuit is a closed circuit; a circulating pump 22 also called 'circulator' 22 delivers a closed loop flow-rate to the heating fluid. The distribution circuit can supply private or community swimming pools. The distribution circuit can supply industrial processes requiring heat or cold feeds.

The distribution circuit 2 is thermally coupled to a heat pump device 1. This heat pump device 1, also more simply called "heat pump" includes a heat-transfer fluid circuit 3 (also sometimes called refrigerant fluid). In the example shown here, carbon dioxide ($CO_2$) is preferably selected as the heat-transfer fluid, but any other compressible fluid suitable to a heat pump circuit can be selected.

The amount of calories provided to the distribution circuit and the various radiators and convectors will be called the first energy quantity Q1 in the remainder of this document.

The heat pump device 1 includes an inside exchanger 11, an outside exchanger 12, a pump assembly 10 comprising a compressor 14, and an expansion valve 17.

The outside exchanger 12 allows heat-transfer fluid 3 to receive calories coming from the outside environment, in a well-known manner, for example from the outside air, a geothermal circuit, a waterway or any other element from which calories can be collected.

The inside exchanger 11 allows the heat-transfer fluid 3 to release calories to the aforementioned heating circuit 2 in a well-known manner.

The expansion valve 17 is also a well-known component and is therefore not described in detail here.

The compressor 14 is a "thermal" compressor. A "thermal" compressor is a compressor moved by means of a thermal energy feed, like for example a compressor described in U.S. Patent Publication No. 2013/0323102. A compressor driven by a gas engine or a compression machine operating by heat absorption can also be called a "thermal" compressor.

Under these conditions, there is no electric compressor in the pump assembly 10 of the heat pump; the energy is mainly fed in thermal form; a negligible quantity of electrical energy can however be used for accessories or the instrumentation.

The thermal energy feed for driving the compressor can be produced by various means and serves to feed a quantity of energy called second energy quantity Q2 to the pump assembly 10 and in particular to the compressor 14. The thermal feed can come from the combustion of a fossil fuel like gas, fuel oil or any other similar combustible; this energy supply will be noted by Q2A.

The thermal feed can additionally come from the combustion of a renewable combustible like wood 51, for example wood pellets or granules, biogas, dried vegetal material or even waste of every type that can be burned; this energy feed coming from renewable combustibles will be noted Q2B. "Free" waste effluents from industrial process (es) can also be burned.

Finally, the thermal feed can come additionally from the combustionless energy source like for example a solar collector 52. This combustionless energy feed will be noted Q2C. Energy can also be recovered from hot graywater intended for the drain as an additional energy feed.

Thus the total thermal feed to the entire pump can be expressed in the form Q2=Q2A+Q2B+Q2C. It should be noted that in a simple sample implementation, only the gas fossil combustible source will be called on; in which case the formula will be Q2=Q2A.

Additionally, the thermal feed can be expressed in the form Q2=Q2F+Q2NF, where Q2F is the part of the thermal feed which is billable and therefore to be paid by the user, whereas Q2NF designates the part of the thermal feed which is not billable, like the solar energy or the combustion of effluents available from burning (case of an industrial building with collective heating).

Q2F includes the portion Q2A and all or part of the portion Q2B.

Concerning the feed coming from the fossil combustible, this is burned in the burner 15 supplied by a channel on which is disposed a meter or flow-rate meter D2.

As is known in the art, the quantity of energy supplied to the heating circuit Q1 can be written as the sum of the energy feed Q2 fed to the pump assembly 10 and a quantity of "free" energy called third energy quantity, noted Q3, and collected in the outside environment by means of the aforementioned outside unit 12.

In other words: Q1=Q2+Q3. In established regime, P1=P2+P3 can be written if P1, P2, P3 are instantaneous powers corresponding to the energy quantities Q1, Q2, Q3.

The second energy quantity Q2 can be determined by means of the already mentioned flow-rate meter or meter D2. In the case of a conventional meter, the integration over time is already done and it will suffice, in particular for an electronic meter, to take the difference between the value at an end of period moment and the value at the beginning of period moment.

It needs to be noted that a portion of Q2 is transferred directly to the fluid of the heating circuit by means of one or more exchangers 26 which serve to cool the compressor 14 using the heating fluid whose temperature generally does not exceed 80° C. No calorie fed for operating the pump assembly 10 is thus lost; advantageously the system does not have a cooling device which removes calories from the pump assembly anywhere else than in the heat-transfer fluid. The calculations done are that way even more accurate.

The energy quantity Q3 can for its part be determined directly or indirectly.

The direct method calls both on temperature sensors T3, T4 preferably disposed at the terminals of the outside unit 12 of the heat pump and also a measurement of the flow-rate D3 of the heat-transfer fluid 3.

Starting from the instantaneous expression P3=D3×(T3−T4), one integrates over time as follows:

$Q3=\int[D3\times(T3-T4)]dt$ over a period of time considered.

The indirect method consists of first determining the first energy quantity Q1 by means of temperature sensor T1 and T2 disposed respectively on the heating fluid leaving and returning to the inside unit 11 of the heat pump and also information about heat-transfer fluid flow-rate D1.

One can write the following equations:

$P1=D1\times(T1-T2)$ $Q1=\int[D1\times(T1-T2)]dt$ over a given period of time.

After having determined the first energy quantity Q1, the third energy quantity Q3 collected in the outside environment can be determined from Q1 by knowing the second energy quantity Q2 over the same given time, by using the formula:

$Q3=Q1-Q2$.

Advantageously according to the invention, using the energy quantities Q2 and Q3 is proposed for quantifying the performance of the heating unit.

Figure 2:
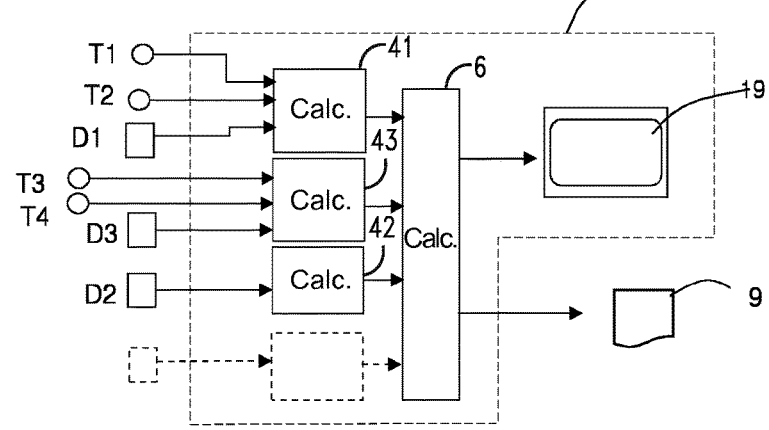
FIG. 2 schematically shows an electronic unit and the peripherals thereof used in the unit from FIG. 1.

More precisely, and as it emerges from FIGS. 1 and 2, an electronic unit 8 is provided to which are connected the means for determining the second energy quantity Q2 and either the means for determining directly the third energy quantity Q3 or the means for first determining the first energy quantity Q1 and deducing from it the third energy quantity Q3.

Additionally, a display screen 19 is optionally provided on which can be displayed, on the one hand one or more time periods corresponding to the calculations of the second and third energy quantities Q2, Q3 over said time periods and on the other hand the values in kilowatt hours of the second and third energy quantities Q2 and Q3 for each time period. The time periods in question can for example be a week, month, quarter, heating season, half-year and full-year.

Referring to FIG. 2, the electronic unit 8 includes a first functional calculation module 41, optional, handling determination of the first energy quantity Q1 by means of the temperature T1, T2 and flow-rate D1 information and does so over a preset time period.

Additionally the electronic unit 8 includes the second functional calculation module 42 handling determination of the second energy quantity Q2 by means of the meter information D2 and does so over the same preset time period. In case of a single number, the billable quantity is obtained directly from a single meter D2, because in this case Q2F=Q2.

Additionally, the electronic unit 8 includes (optionally as an alternative to the first calculation module 41) a third functional calculation module 43, optional, handling determination of the third energy quantity Q3 from temperature T3, T4 and flow-rate D3 information and does so over the same preset time period.

A summary calculation module 6 formulates the energy quantities Q2F and Q3 in order to make them available for display and/or printing as will be detailed later. The summary calculation module 6 furthermore calculates as necessary an efficiency factor Q1/Q2 (or Q1/Q2F instead if additional means of thermal feed are used) similar to a heat pump performance factor known in the art.

The control unit 8 thus prepares a set of information meant for local display and made available for any remote electronic equipment, where the set of information contains once or several times:

The preset time period,

The billable second energy quantity Q2F, and also as applicable the financial equivalent thereof representing the cost thereof if the information is available locally;

The third energy quantity Q3, and optionally, and if the equivalent cost information is available locally, the financial equivalent of this third energy quantity Q3 representing the savings achieved through the presence of the heat pump. As applicable, Q3 can be supplemented by Q2NF ("free" portion of the thermal feed Q2).

Figure 3:
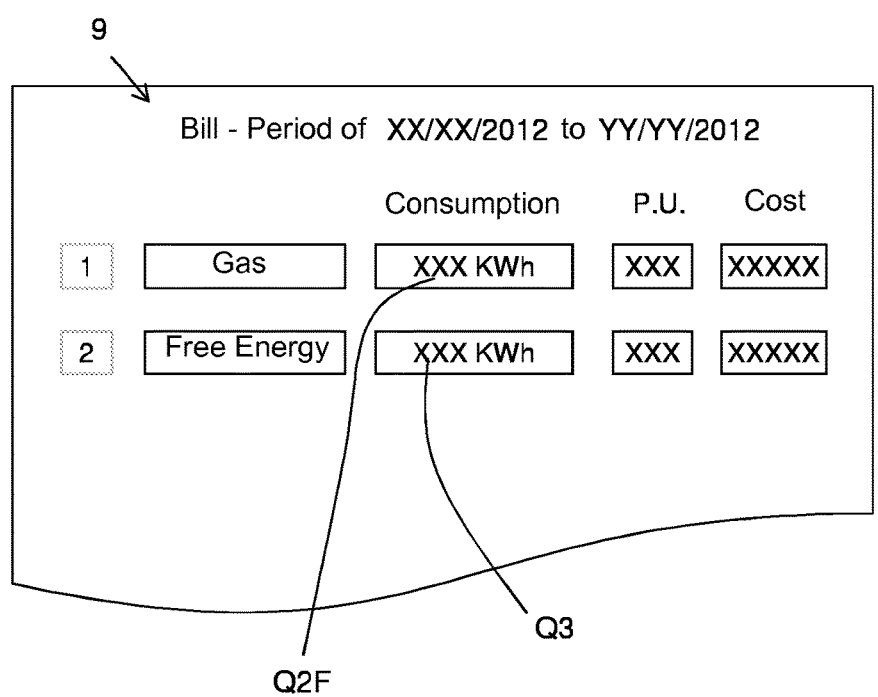
FIG. 3 shows a sample bill illustrating the information made available to the user.

After transmission to electronic equipment or a computer, this information can be printed in the form of a bill 9, an example of which is shown in FIG. 3.

It should be noted the position of the temperature sensors T1 to T4 and the flow-rate sensors D1, D2, D3 can vary from the position shown in the example illustrated.

The circulating pump 22 can be driven by an electric motor, but it is appropriate to note that the total electric consumption of the heating unit, even including this electric consumption by the circulating pump 22 remains much less than the energy quantity Q1 provided to the heating distribution circuit, in particular less than 10% of Q1nom, were Q1nom corresponds to the nominal power of the heating unit.

The invention claimed is:

1. A method for indicating consumption in billable combustible and free energy gathered in an outside environment of a heating unit to a user wherein said heating unit includes at least one heat pump with a thermal compressor driven by a thermal energy feed, a heating fluid distribution circuit and a plurality of convectors or radiators receiving an energy quantity Q1, the thermal compressor mainly using as a cold source the heating fluid distribution circuit and the thermal energy feed being at least provided by burning a billed combustible, wherein the method comprises at least:

A—measuring, via a combustible meter, over a preset time period, a quantity of billable combustible burnt to provide at least a part of the thermal energy feed to the thermal compressor of the heat pump and determining, using the quantity of billable combustible burnt over the preset time period, a corresponding amount of a billed energy quantity Q2F, B—measuring, via first and second temperature sensors and a flow-rate sensor, over the preset time period, on a heat transfer circuit of the heat pump, a temperature of a heat transfer fluid before and after passing through an outside exchanger and a flow-rate of the heat transfer fluid passing through the outside exchanger and determining, over the preset time period, based on said measurements, an energy quantity Q3 corresponding to a quantity of said free energy gathered in the outside environment, where the energy quantity Q3 is obtained by integrating a temperature difference across the outside exchanger multiplied by the flow-rate across the outside exchanger, C—displaying at least the consumption of the heating unit in billable combustible and free energy gathered in the outside environment by displaying the energy quantities Q2F and Q3, corresponding to the preset time period, on a display screen and/or a document intended for billing the client.

2. The method according to claim 1, wherein the thermal energy feed is mainly provided by a combustible burner.

3. The method according to claim 2, wherein the combustible includes gas and/or domestic fuel oil and/or wood pellets, and the billed energy quantity Q2F is measured by a meter.

4. The method according to claim 1, wherein a financial equivalent for nonbillable energy quantities is additionally calculated, wherein the non-billable energy quantities are calculated as being equal to Q1-Q2F, and wherein this financial equivalent is to be displayed.

5. The method according to claim 1, wherein the heat pump does not have an electric pump and an electric consumption of the heating unit is less than 10% of Q1nom, where Q1nom corresponds to a nominal power of the heating unit.

6. A device for indicating a consumption in billable combustible and free energy gathered in an outside environment of a heating unit, said heating unit including at least one heat pump having a thermal compressor moved by a thermal energy feed, a heating fluid distribution circuit and a plurality of convectors or radiators, the thermal compressor mainly using as a cold source the heating fluid distribution circuit and the thermal energy feed being at least provided by burning a billed combustible, wherein the device comprises:

first and second temperature sensors configured to respectively measure, on a heat transfer circuit of the heat pump, temperatures of a heat transfer fluid before and after passing through an outside exchanger of the heat pump, a flow-rate sensor configured to measure a flow-rate of the heat transfer fluid passing through the outside exchanger, an electronic unit configured to determine an energy quantity Q3 corresponding to a quantity of said free energy collected in the outside environment based on the measurements, on the heat transfer circuit, of the first and second temperature sensors and the flow-rate sensor, a combustible meter configured to determine an energy quantity Q2F corresponding to a billed consumption of combustible consumed by the heat pump thermal compressor based on measurements provided by said combustible meter, wherein the first and second temperature sensors, the flow-rate sensor, and the combustible meter are connected to the electronic unit, wherein the electronic unit is adapted for calculating the energy quantities Q2F and Q3 corresponding to a consumption of the heating unit in billable combustible and free energy gathered in the outside environment over a preset time period, and/or for displaying values of the energy quantities Q2F and Q3 on a display screen, and/or for preparing the values of the energy quantities Q2F and Q3 for printing of a document intended for billing the client.

7. The device according to claim 6, wherein the combustible is gas or domestic fuel oil and wherein the combustible meter includes a gas or fuel oil meter configured to measure the energy quantity Q2F and disposed on a channel supplying the heating unit with said combustible.

8. The device according to claim 6, wherein the heat pump does not have an electric pump and an electric consumption of the heating unit is less than 10% of Q1nom, where Q1nom corresponds to a nominal power of the heating unit.

9. A method for indicating consumption in billable combustible and free energy gathered in an outside environment of a heating unit to a user wherein said heating unit includes at least one heat pump with a thermal compressor driven by a thermal energy feed, a heating fluid distribution circuit, and a plurality of convectors or radiators receiving a first energy quantity Q1, the thermal compressor mainly using as a cold source the heating fluid distribution circuit and the thermal energy feed being at least provided by burning a billed combustible, wherein the method comprises at least:

measuring, over a preset time period, using a meter or a combustible flow rate meter, a quantity of combustible burnt by a combustible burner and/or a quantity of thermal energy provided by a combustionless energy source, said combustible burnt by a combustible burner and said combustionless energy source providing the thermal energy feed of the thermal compressor, and determining, over said preset time period, a second energy quantity Q2 corresponding to said thermal feed provided to the thermal compressor of the heat pump, measuring, over the preset time period, the first energy quantity Q1 supplied to the distribution circuit using first and second indoor temperature sensors configured to respectively measure, on the heating fluid distribution circuit, temperatures of a heating fluid before and after passing through the plurality of convectors or radiators and an indoor flow-rate sensor configured to measure a flow rate of the heating fluid distribution circuit, where the first energy quantity Q1 is obtained by integrating a temperature difference across the convectors or radiators, multiplied by the flow-rate across the convectors or radiators, determining, over the preset time period, a third energy quantity Q3 corresponding to a quantity of said free energy gathered in the outside environment, wherein the third energy quantity Q3 is obtained by subtracting Q2 from Q1, namely Q3=Q1−Q2, measuring, via a combustible meter, over a preset time period, a quantity of billable combustible burnt to provide at least a part of the thermal energy feed to the thermal compressor of the heat pump and determining, using the quantity of billable combustible burnt, over said preset time period, a corresponding amount of a billed energy Q2F, displaying at least the consumption of the heating unit in billable combustible and free energy gathered in the outside environment by displaying the energy quantities Q2F and Q3, corresponding to the preset time period, on a display screen and/or a document intended for billing the client.

10. The method according to claim 9, further comprising calculating an efficiency of the heating unit by calculating Q1/Q2F.

* * * * *